(12) United States Patent
Tang et al.

(10) Patent No.: US 9,099,133 B1
(45) Date of Patent: Aug. 4, 2015

(54) DISK DRIVE SERVO CONTROL USING HYBRID UPSAMPLE FILTER

(71) Applicant: Western Digital Technologies, Inc., Irvine, CA (US)

(72) Inventors: Shan Tang, Irvine, CA (US); Lu Feng, Foothill Ranch, CA (US); Yanan Huang, Torrance, CA (US); Alexander Babinski, Laguna Niguel, CA (US); Min Chen, San Jose, CA (US); Orhan Beker, Dove Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/752,693

(22) Filed: Jan. 29, 2013

(51) Int. Cl.
*G11B 21/02* (2006.01)
*G11B 5/02* (2006.01)
*G11B 5/58* (2006.01)
*G11B 5/55* (2006.01)

(52) U.S. Cl.
CPC ........................... *G11B 5/553* (2013.01)

(58) Field of Classification Search
None
See application file for complete search history.

(56) References Cited

U.S. PATENT DOCUMENTS

| | | | |
|---|---|---|---|
| 5,325,247 A | 6/1994 | Ehrlich et al. | |
| 5,541,784 A | 7/1996 | Cribbs et al. | |
| 5,608,586 A | 3/1997 | Sri-Jayantha et al. | |
| 5,696,647 A | 12/1997 | Phan et al. | |
| 6,115,203 A | 9/2000 | Ho et al. | |
| 6,118,616 A | 9/2000 | Jeong | |
| 6,411,461 B1 | 6/2002 | Szita | |
| 6,476,998 B2 | 11/2002 | Cheung | |
| 6,560,059 B1 | 5/2003 | Hsin et al. | |
| 6,563,663 B1 | 5/2003 | Bi et al. | |
| 6,785,080 B1 | 8/2004 | Sun et al. | |
| 6,850,386 B2 | 2/2005 | Kovinskaya et al. | |
| 6,950,273 B2 | 9/2005 | Nakagawa et al. | |
| 7,035,034 B2 | 4/2006 | Semba et al. | |
| 7,046,476 B1 | 5/2006 | Albrecht et al. | |
| 7,046,478 B2 | 5/2006 | Zhang et al. | |
| 7,158,333 B1 * | 1/2007 | Sutardja et al. | 360/77.02 |
| 7,208,898 B2 | 4/2007 | Stoecker et al. | |
| 7,289,291 B1 | 10/2007 | Schlumberger | |
| 7,423,834 B1 | 9/2008 | Sun et al. | |
| 7,474,494 B2 | 1/2009 | Atsumi et al. | |
| 7,486,469 B1 | 2/2009 | Semba | |
| 7,489,469 B2 | 2/2009 | Sun et al. | |
| 7,538,964 B2 | 5/2009 | Kisaka | |
| 7,583,469 B1 | 9/2009 | Sutardja et al. | |
| 7,764,458 B1 | 7/2010 | Sutardja et al. | |
| 2001/0055177 A1 | 12/2001 | Cheung | |
| 2002/0048113 A1 | 4/2002 | Chu et al. | |

(Continued)

Primary Examiner — K. Wong

(57) ABSTRACT

A disk drive is disclosed comprising a disk comprising a plurality of servo tracks, wherein each servo track comprises a plurality of servo sectors, and an actuator for actuating a head over the disk in response to an actuator control signal. The servo sectors are read to generate a first sequence of control samples $x[k]$ at a sample frequency corresponding to a frequency of the servo sectors. A hybrid upsample filter is used to upsample by a factor of N the first sequence of control samples $x[k]$ to generate a second sequence of control samples $y[k_i]$, wherein the hybrid upsample filter provides a higher phase gain than a zero-order type upsample filter at frequencies less than one kilohertz, and approximately the same attenuation as a first-order type upsample filter around the sample frequency. The actuator control signal is generated in response to the second sequence of control samples $y[k_i]$.

16 Claims, 4 Drawing Sheets

(56) References Cited

U.S. PATENT DOCUMENTS

2003/0206365 A1 11/2003 Ho et al.
2005/0058031 A1 3/2005 Hanks
2006/0066986 A1 3/2006 Shih
2006/0077588 A1 4/2006 Shih
2010/0054098 A1 3/2010 Dunn

* cited by examiner

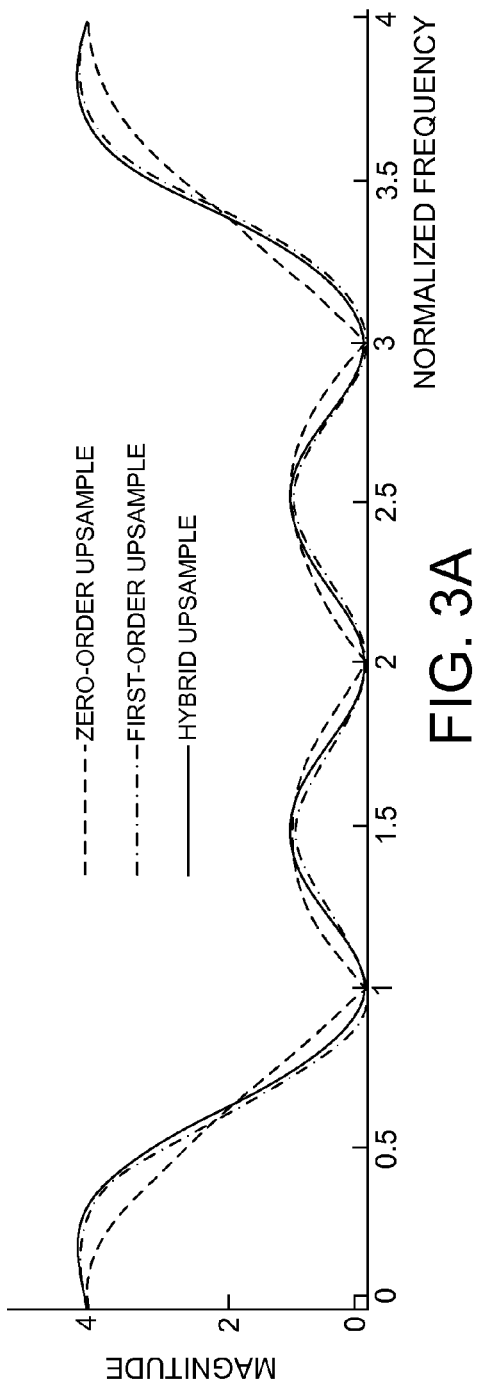
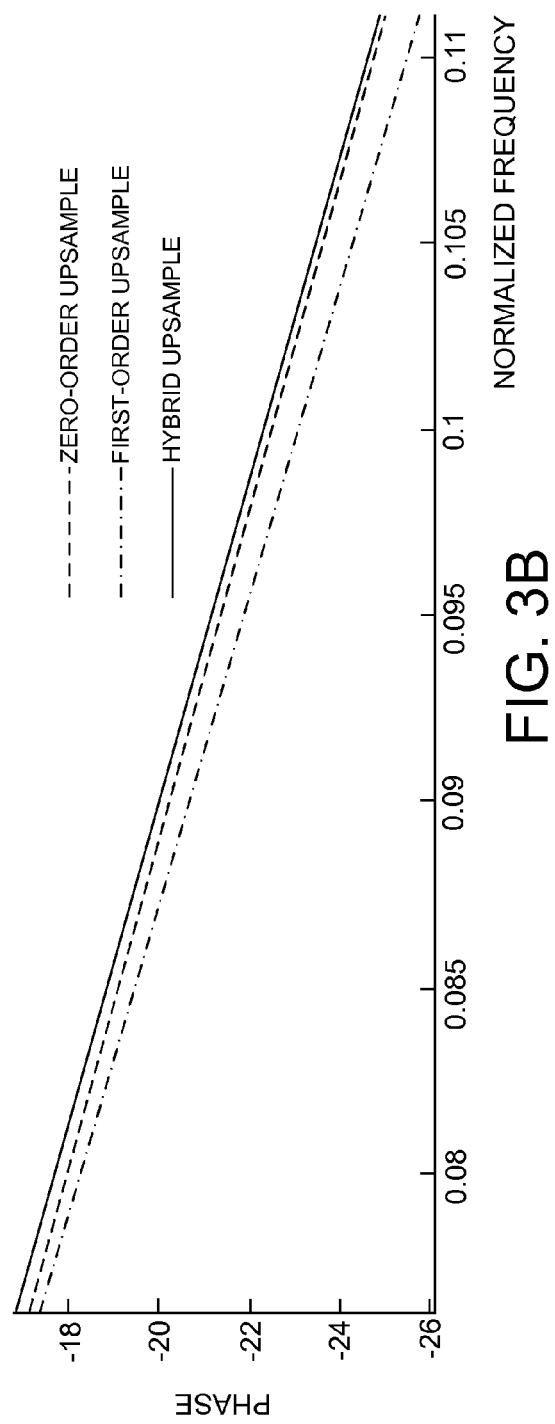
FIG. 3A
FIG. 3B

DISK DRIVE SERVO CONTROL USING HYBRID UPSAMPLE FILTER

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIGS. 3A and 3B illustrate an embodiment of the present invention wherein the hybrid upsample filter provides a higher phase gain than a zero-order type upsample filter at frequencies less than one kilohertz, and approximately the same attenuation as a first-order type upsample filter around the sample frequency.

DETAILED DESCRIPTION

Figure 1:
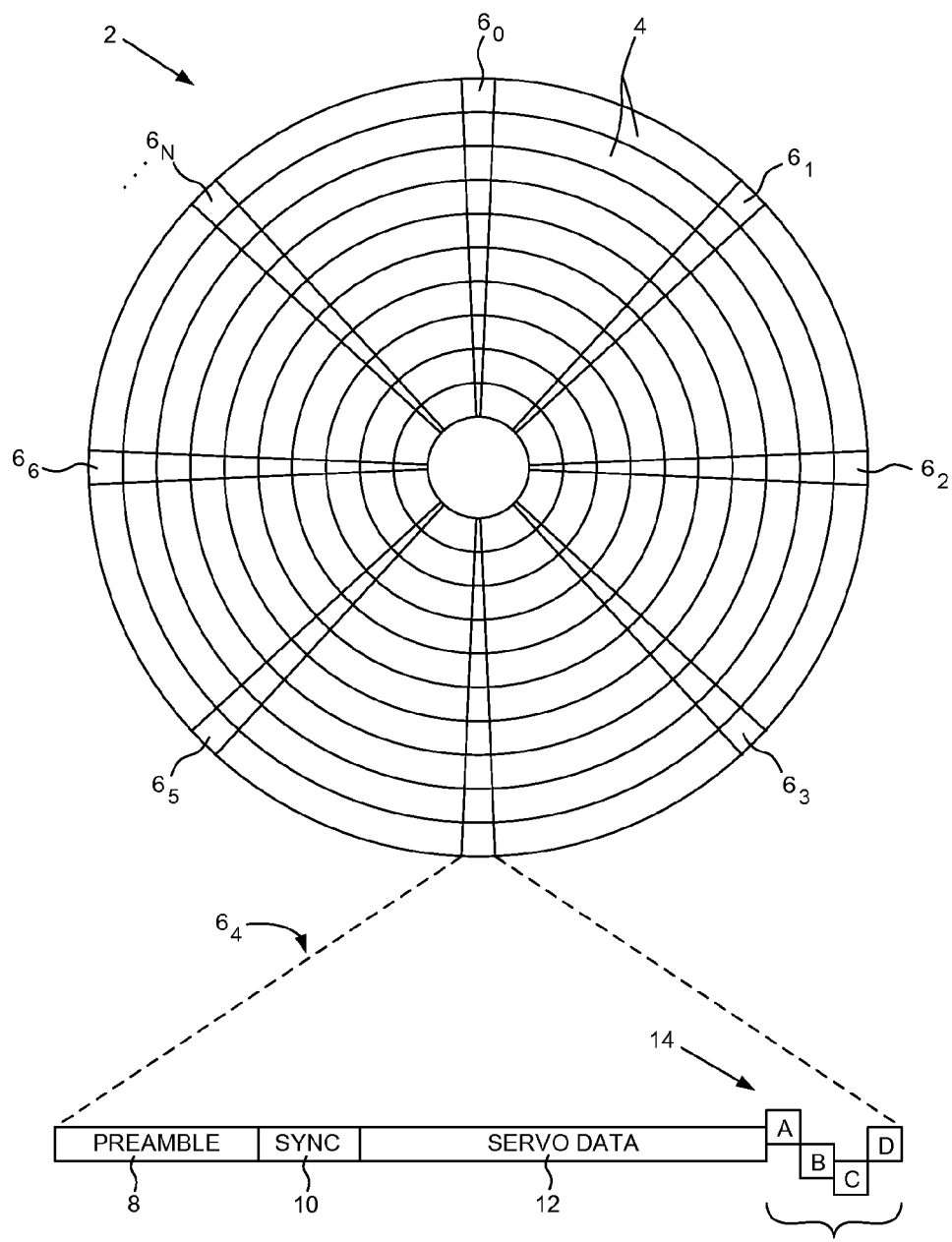
FIG. 1 shows a prior art disk format comprising a plurality of servo tracks defined by servo sectors.
Figure 2A:
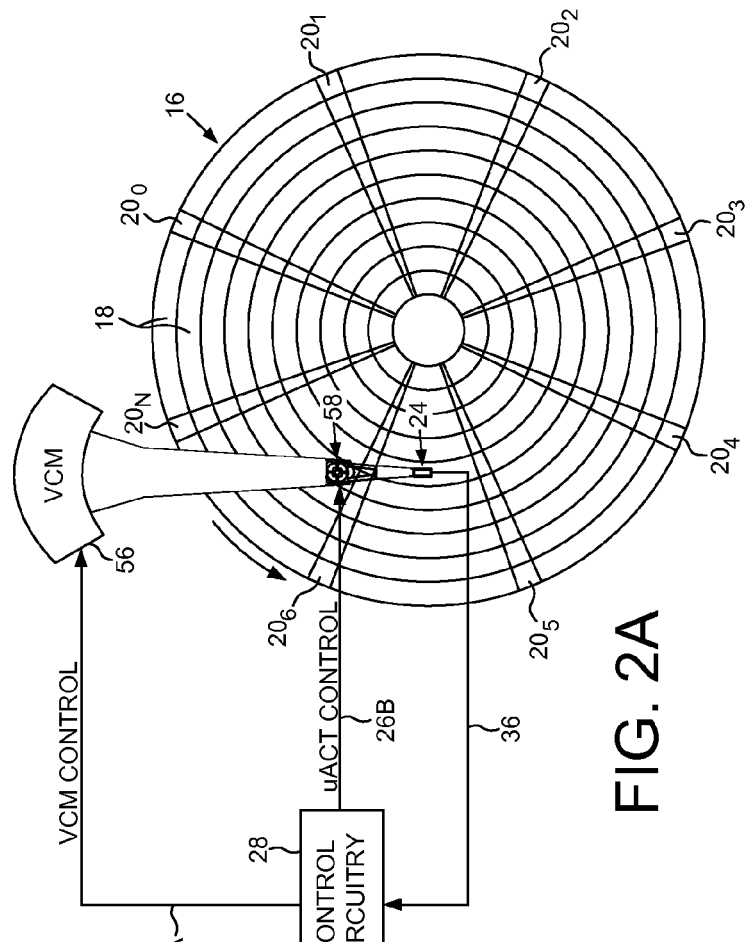
FIG. 2A shows a disk drive according to an embodiment of the present invention comprising a head actuated over a disk.
Figure 2B:
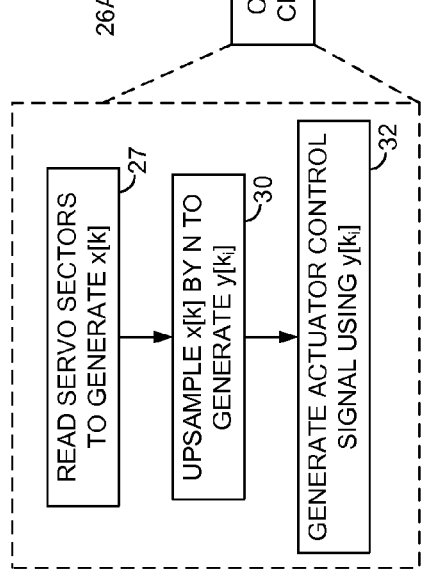
FIG. 2B is a flow diagram according to an embodiment of the present invention wherein a hybrid upsample filter upsamples by a factor of N a first sequence of control samples x[k] to generate a second sequence of control samples $y[k_i]$.
Figure 2C:
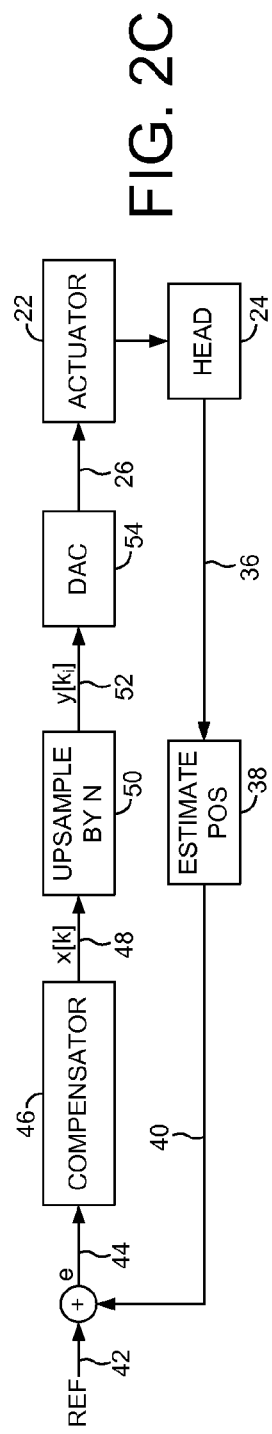
FIG. 2C shows a servo control system comprising the upsample filter according to an embodiment of the present invention.

FIG. 2A shows a disk drive according to an embodiment of the present invention comprising a disk 16 comprising a plurality of servo tracks 18, wherein each servo track comprises a plurality of servo sectors $20_0$-$20_N$, and an actuator 22 for actuating a head 24 over the disk 16 in response to an actuator control signal 26 (FIG. 2C). The disk drive further comprises control circuitry 28 operable to execute the flow diagram of FIG. 2B, wherein the servo sectors are read to generate a first sequence of control samples x[k] at a sample frequency corresponding to a frequency of the servo sectors (block 27). A hybrid upsample filter is used to upsample by a factor of N the first sequence of control samples x[k] to generate a second sequence of control samples $y[k_i]$ (block 30), wherein the hybrid upsample filter provides a higher phase gain than a zero-order type upsample filter at frequencies less than one kilohertz, and approximately the same attenuation as a first-order type upsample filter around the sample frequency. The actuator control signal is generated in response to the second sequence of control samples $y[k_i]$ (block 32).

FIG. 2C shows a servo control system according to an embodiment of the present invention for generating the actuator control signal 26 applied to the actuator 22. A signal 36 emanating from the head 24 is processed 38 to generate an estimated position 40 of the head. The estimated position 40 is subtracted from a reference position 42 to generate an error signal 44. A suitable compensator 46 processes the error signal 44 to generate the first sequence of control samples x[k] 48. The first sequence of control samples x[k] 48 is upsampled by a factor of N using a hybrid upsample filter 50 to generate the second sequence of control samples $y[k_i]$ 52 (where i=1→N for each k). A digital-to-analog converter (DAC) 54 converts the upsampled control samples $y[k_i]$ 52 into the actuator control signal 26 applied to the actuator 22. FIG. 2C shows a general overview of a servo control system whereas the actual implementation may comprise additional signal processing, such as a multirate notch filter for filtering the second sequence of control samples $y[k_i]$ 52 prior to generating the actuator control signal 26.

Any suitable actuator 22 may be employed in the embodiments of the present invention for actuating the head 24 over the disk 16, such as an actuator that actuates the head 24 radially over the disk 16 or vertically over the disk 16. In one embodiment, the actuator 22 may comprise a voice coil motor (VCM) 56 (FIG. 2A) for actuating the head 24 radially over the disk 16 in response to an actuator control signal 26A, and in another embodiment the actuator 22 may comprise a suitable microactuator 58 (e.g., a piezoelectric actuator) for actuating the head 24 radially over the disk 16 in response to an actuator control signal 26B. In yet another embodiment, the actuator 22 may comprise a suitable fly height actuator (not shown) for actuating the head 24 vertically over the disk 16 in response to a fly height measurement.

In one embodiment, upsampling helps smooth the staircase transitions in the control samples x[k] 48 which helps reduce resonance excitation and other disturbances in the vicinity of the sample rate and the sample rate harmonics, thereby improving performance of the servo control system, particularly during a seek operation when the head is actuated radially over the disk to a target data track. A first-order type upsample filter has been employed in prior art disk drives during seek operations since it provides the desired attenuation at the sample rate and sample rate harmonics. During a tracking operation wherein the head is maintained over the target data track while accessing the disk (write/read operation), the resonance excitation is not as significant since lower amplitude control signals are applied to the actuator(s). Accordingly, during tracking prior art disk drives have employed a zero-order type upsample filter to reduce phase loss at low frequencies as compared to a first-order type upsample filter. The zero-order type upsample filter improves performance of the servo control system since the performance during tracking is typically determined by the low frequency response of the servo control system.

When the prior art disk drives transition between the seek mode and tracking mode (and vise versa), a transient may be introduced into the servo control system due to switching between the first-order type and the zero-order type upsample filters. In the embodiments of the present invention, a hybrid upsample filter 50 is used during both the seek mode and tracking mode so as to minimize the transients caused by switching between a first-order type and a zero-order type upsample filter as in the prior art. The hybrid upsample filter 50 in the embodiments of the present invention is designed to provide a higher phase gain than a zero-order type upsample filter at frequencies less than one kilohertz, and approximately the same attenuation as a first-order type upsample filter around the sample frequency. In this manner, the hybrid upsample filter 50 provides the desired attenuation at the sample frequency (and optionally sample frequency harmonics) during seeks, as well as reduces the phase loss at lower frequencies during tracking. That is, the hybrid upsample filter 50 in the embodiments of the present invention provides similar performance as the first-order type upsample filter during seeks, and provides similar performance as the zero-order type upsample filter during tracking, while avoiding the transients caused by switching between a first-order type and a second-order type upsample filter as in the prior at.

FIG. 3A shows the amplitude response of an example hybrid upsample filter (normalized frequency) as compared to a first-order type and a second order type upsample filter, including the desired attenuation at the sample frequency and sample frequency harmonics which improves the seek performance of the servo control system by attenuating resonance excitation and other disturbances. FIG. 3B shows the phase response of the example hybrid upsample filter (normalized frequency) as compared to a first-order type and a second order type upsample filter, including a phase gain higher than a zero-order type upsample filter at low frequencies which improves the tracking performance of the servo control system. In one embodiment, the hybrid upsample filter provides a higher phase gain than a zero-order type upsample filter at frequencies less than one kilohertz, but the hybrid upsample filter may also provide higher phase gain than a zero-order type upsample filter at frequencies higher than one kilohertz.

In one embodiment, the hybrid upsample filter comprises an upsampler which generates an upsampled sequence (such as $x_0$, 0, 0, 0, $x_1$, 0, 0, 0, $x_2$, 0, 0, 0 . . . for N=4) followed by an interpolator which interpolates the x[k] samples to fill-in the zero samples of the upsampled sequence. In one embodiment, the upsampler and interpolator are implemented as an $m^{th}$ order filter of the form:

$$G = (a_0 + a_1 z^{-1} + a_2 z^{-2} + a_3 z^{-3} + a_4 z^{-4} + a_5 z^{-5} + a_6 z^{-6} \ldots a_m z^{-m})\big|_{z=e^{\frac{sT_s}{N}}}$$

where $1/T_s$ represents the sample frequency, and $a_0 \ldots a_m$ are coefficients that define the $m^{th}$ order filter. The sample frequency is the inverse of the sample interval $T_s$ which is the time between consecutive servo sectors and depends on the rotation speed of the disk 16. In one embodiment, the coefficients $a_0 \ldots a_m$ are optimized to provide the higher phase gain than a zero-order type upsample filter at frequencies less than one kilohertz, and approximately the same attenuation as a first-order type upsample filter around the sample frequency.

Any suitable technique may be utilized to optimize the coefficients $a_0 \ldots a_m$ of $m^{th}$ order filter to achieve the desired attenuation at the sample frequency (and optionally harmonics), as well as higher phase gain at lower frequencies. In one embodiment, a cost function may be defined representing the difference between a target attenuation/phase gain and a measured attenuation/phase gain. The coefficients $a_0 \ldots a_m$ may then be adapted toward values that attempt to minimize the cost function. In another embodiment, the desired frequency response of the hybrid filter may be defined (amplitude and phase) and then an inverse Fourier transform computed to generate the coefficients $a_0 \ldots a_m$ of the hybrid filter.

When N=4 and m=7 such that the above $m^{th}$ order filter defines an $8^{th}$ order filter, the coefficients $a_0 \ldots a_7$ for a zero-order type upsample filter may be defined as:

(1,1,1,1,0,0,0,0)

whereas the coefficients for a first-order type upsample filter may be defined as:

(5,7,9,11,3,1,−1,−3)/8

In one embodiment, a search algorithm may adapt the coefficients $a_0 \ldots a_7$ of the hybrid filter relative to the above values when attempting to minimize the above described cost function. For the hybrid upsample filter represented by the amplitude/phase response shown in FIGS. 3A and 3B, the search algorithm may select the following values for the coefficients $a_0 \ldots a_7$:

(5872,7226,9513,10809,2320,966,−1321,−2617)/8192

Figure 4:
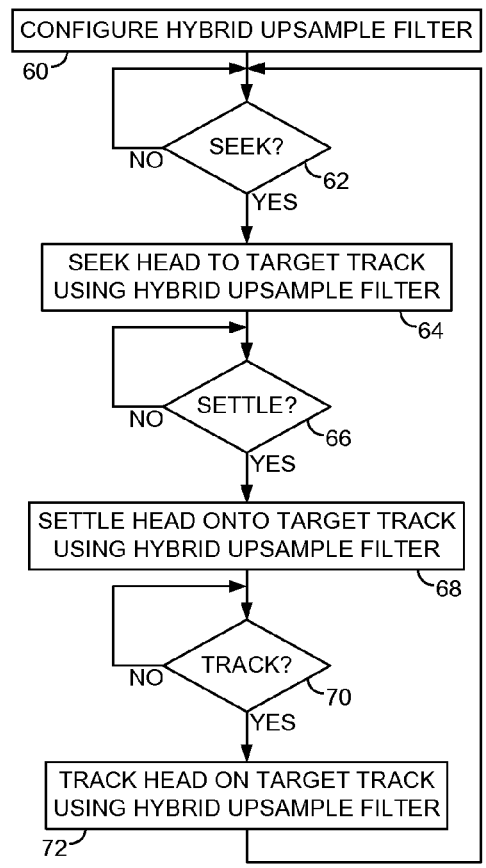
FIG. 4 is a flow diagram according to an embodiment of the present invention wherein coefficients of the hybrid upsample filter remain constant during seek, settle, and tracking operations so as to minimize transients in the servo control system.

FIG. 4 is a flow diagram according to an embodiment of the present invention wherein the hybrid upsample filter is configured, for example, by configuring the coefficients $a_0 \ldots a_m$ of the above $m^{th}$ order filter (block 60). When a seek operation is executed (block 62), the servo control system seeks the head toward a target data track using the hybrid upsample filter (block 64). When the head nears the target data track (block 66), the servo control system switches to a settle mode without reconfiguring the hybrid filter, and settles the head onto the target track (block 68). After settling onto the target track (block 70), the servo control system switches to a tracking mode without reconfiguring the hybrid filter, and begins tracking the centerline of the target track (block 72). This process is then repeated for the next seek operation at block 62 without reconfiguring the hybrid upsample filter, thereby avoiding the transient that would otherwise occur if the hybrid upsample filter were switched between a zero-order type upsample filter and a first-order upsample filter as in the prior art.

Figure 5:
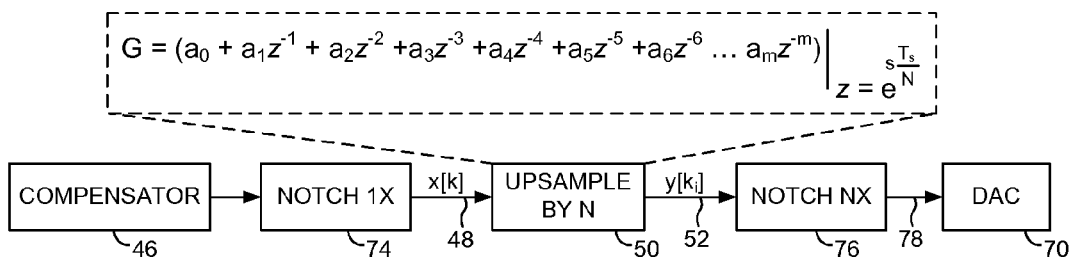
FIG. 5 shows an embodiment of the present invention wherein the upsampled sequence of control samples is filtered with a multirate notch filter to generate the actuator control signal.

FIG. 5 shows an embodiment of the present invention wherein the signal samples output by the compensator 46 are filtered by a first notch filter 74 (operating at the 1× frequency of the sample rate) to generate the sequence of control samples x[k] that is upsampled by N using the hybrid upsample filter 50 to generate the sequence of control samples y[$k_i$]. A second notch filter 76 (operating at the Nx frequency of the sample rate) filters the sequence of control samples y[$k_i$] to generate the control samples 78 applied to the DAC 54. The first and second notch filters may provide additional attenuation at the sample frequency, sample frequency harmonics, and/or any other target frequencies where attenuation may improve performance of the servo control system.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
a disk comprising a plurality of servo tracks, wherein each servo track comprises a plurality of servo sectors;
a head;
an actuator for actuating the head over the disk in response to an actuator control signal; and
control circuitry operable to:
read the servo sectors to generate a first sequence of control samples x[k] at a sample frequency corresponding to a frequency of the servo sectors;
use a hybrid upsample filter to upsample by a factor of N the first sequence of control samples x[k] to generate a second sequence of control samples y[$k_i$], wherein the hybrid upsample filter provides a higher phase gain than a zero-order type upsample filter at frequencies less than one kilohertz, and approximately the same attenuation as a first-order type upsample filter around the sample frequency; and
generate the actuator control signal in response to the second sequence of control samples y[$k_i$].

2. The disk drive as recited in claim 1, wherein the control circuitry is further operable to upsample the first sequence of control samples x[k] to generate the second sequence of control samples y[$k_i$] during a seek operation and during a tracking operation.

3. The disk drive as recited in claim 1, wherein the hybrid upsample filter provides approximately the same attenuation as the first-order type upsample filter around one or more harmonics of the sample frequency.

4. The disk drive as recited in claim 1, wherein the hybrid upsample filter comprises an upsampler and an interpolator.

5. The disk drive as recited in claim 4, wherein the hybrid upsample filter comprises a transfer function of:

$$G = (a_0 + a_1 z^{-1} + a_2 z^{-2} + a_3 z^{-3} + a_4 z^{-4} + a_5 z^{-5} + a_6 z^{-6} \ldots a_m z^{-m})\Big|_{z=e^{\frac{sT_s}{N}}}$$

where:
$1/T_s$ represents the sample frequency; and
$a_0 \ldots a_m$ are coefficients that define a $m^{th}$ order filter.

6. The disk drive as recited in claim 5, wherein the coefficients $a_0 \ldots a_m$ are optimized to provide the higher phase gain than the phase gain of the zero-order type upsample filter at frequencies less than one kilohertz, and approximately the same attenuation as the first-order type upsample filter around the sample frequency.

7. The disk drive as recited in claim 5, wherein the coefficients $a_0 \ldots a_m$ are the same during a seek operation and during a tracking operation thereby minimizing a transient when transitioning from a seek operation to a tracking operation.

8. The disk drive as recited in claim 5, wherein the coefficients $a_0 \ldots a_m$ are the same during a seek operation and during a tracking operation thereby minimizing a transient when transitioning from the tracking operation to the seek operation.

9. A method of operating a disk drive comprising a disk comprising a plurality of servo tracks, wherein each servo track comprises a plurality of servo sectors, and an actuator for actuating a head over the disk in response to an actuator control signal, the method comprises:
reading the servo sectors to generate a first sequence of control samples x[k] at a sample frequency corresponding to a frequency of the servo sectors;
using a hybrid upsample filter to upsample by a factor of N the first sequence of control samples x[k] to generate a second sequence of control samples y[$k_i$], wherein the hybrid upsample filter provides a higher phase gain than a zero-order type upsample filter at frequencies less than one kilohertz, and approximately the same attenuation as a first-order type upsample filter around the sample frequency; and
generating the actuator control signal in response to the second sequence of control samples y[$k_i$].

10. The method as recited in claim 9, further comprising upsampling the first sequence of control samples x[k] to generate the second sequence of control samples y[$k_i$] during a seek operation and during a tracking operation.

11. The method as recited in claim 9, wherein the hybrid upsample filter provides approximately the same attenuation as the first-order type upsample filter around one or more harmonics of the sample frequency.

12. The method as recited in claim 9, wherein the hybrid upsample filter comprises an upsampler and an interpolator.

13. The method as recited in claim 12, wherein the hybrid upsample filter comprises a transfer function of:

$$G = (a_0 + a_1 z^{-1} + a_2 z^{-2} + a_3 z^{-3} + a_4 z^{-4} + a_5 z^{-5} + a_6 z^{-6} \ldots a_m z^{-m})\Big|_{z=e^{\frac{sT_s}{N}}}$$

where:
$1/T_s$ represents the sample frequency; and
$a_0 \ldots a_m$ are coefficients that define a $m^{th}$ order filter.

14. The method as recited in claim 13, wherein the coefficients $a_0 \ldots a_m$ are optimized to provide the higher phase gain than the phase gain of the zero-order type upsample filter at frequencies less than one kilohertz, and approximately the same attenuation as the first-order type upsample filter around the sample frequency.

15. The method as recited in claim 13, wherein the coefficients $a_0 \ldots a_m$ are the same during a seek operation and during a tracking operation thereby minimizing a transient when transitioning from the seek operation to the tracking operation.

16. The method as recited in claim 13, wherein the coefficients $a_0 \ldots a_m$ are the same during a seek operation and during a tracking operation thereby minimizing a transient when transitioning from the tracking operation to the seek operation.

* * * * *